United States Patent [19]

Higuchi et al.

[11] Patent Number: 5,022,294
[45] Date of Patent: Jun. 11, 1991

[54] CUTTING APPARATUS FOR A NONCIRCULAR CROSS SECTION

[75] Inventors: Toshiro Higuchi, Yokohama; Hazime Izumi, Kawagoe; Minoru Tanaka, Kitamoto, all of Japan

[73] Assignee: Izumi Industries, Ltd., Saitama, Japan

[21] Appl. No.: 338,841

[22] Filed: Apr. 17, 1989

[30] Foreign Application Priority Data

Aug. 9, 1988 [JP] Japan .................................. 63-197251

[51] Int. Cl.$^5$ .......................... B23B 5/24; B23B 21/00
[52] U.S. Cl. ........................................... 82/18; 82/137; 267/161; 267/162; 318/119; 318/521
[58] Field of Search .......................... 82/18, 118, 137; 318/114, 119, 127, 128; 267/160, 161, 162

[56] References Cited

U.S. PATENT DOCUMENTS

| | | | |
|---|---|---|---|
| 1,941,655 | 1/1934 | Blomqvist et al. | 318/119 |
| 2,561,405 | 7/1951 | O'Brien et al. | 267/159 |
| 2,881,366 | 4/1959 | Dietz | 267/161 |
| 3,623,695 | 11/1971 | Hislop | 267/161 |
| 3,649,092 | 3/1972 | Coleman | 267/161 |
| 4,203,062 | 5/1980 | Bathen | 318/571 |
| 4,653,360 | 3/1987 | Compton | 82/18 |
| 4,726,395 | 2/1988 | Howes et al. | 267/162 |

OTHER PUBLICATIONS

Kuo, Benjamin C., "Automatic Control Systems", Third Edition, Prentice-Hall Inc., 1975, pp. 295-305.

Primary Examiner—William E. Terrell
Attorney, Agent, or Firm—Burns, Doane, Swecker & Mathis

[57] ABSTRACT

A cutting apparatus for forming a noncircular cross-section on a workpiece that includes a tool advancing and retreating device. The tool advancing and retreating device includes a central shaft on which is to be mounted a tool, a journal for supporting the central shaft, a movable plate fixed to the central shaft, and electromagnets positioned opposite to one another such that the movable plate is interposed between the electromagnets with a clearance between the plate and the electromagnets. A device is provided for detecting the rotational angle of the main shaft and a displacement sensor is included for detecting the longitudinal displacement of the central shaft. A speed sensor detects the speed of the longitudinal displacement of the central shaft and an arrangement is provided for controlling the electric current passing through the electromagnets based on the output signals from the rotational angle detecting device, from the displacement sensor and from the speed sensor. The journal that supports the central shaft includes a mount and a plurality of leaf springs which are secured to the central shaft and to a holder. The holder is also secured to the mount.

1 Claim, 9 Drawing Sheets

CUTTING APPARATUS FOR A NONCIRCULAR CROSS SECTION

BACKGROUND OF THE INVENTION (a) Field of the Invention

The present invention relates to a cutting apparatus for a noncircular cross section for machining a workpiece having a noncircular cross section such as a piston for an internal combustion engine, an outer circumferential surface of which has a noncircular cross section.

(b) Description of the Prior Art

Heretofore, in order to work a workpiece having a noncircular cross section, a profiling machining process using a master cam has often been utilized. Such profiling machining process has several disadvantages, for example, it is necessary to use the master cam, the manufacture of which requires much time and cost. Further, the configuration of the master cam which can be formed is restricted to a certain allowable extent because of its peculiar problem of making the master cam, and therefore it is impossible to form the workpiece to an optional configuration.

Furthermore, since a follow-up characteristic of a profiling machining device is restricted, the workpiece is limited in the increase of its relating speed, and thus it is impossible to drive the device at high speed, and therefore it is difficult to shorten a cycle-time.

In some instances, an outer diameter cutting process by NC-control without using the master cam is utilized. This process is possible at low speed, however, it is impossible at high speed. That is because, in a hydraulic servo-system, a response characteristic of a servo-valve is low and thus a response speed of a hydraulic cylinder can not be increased. Further, the control of the oil temperature is difficult and thus the response characteristic of the cylinder is changed owing to the variation of the oil temperature. On the other hand, in a system utilizing the servo-motor, the servo-motor is frequently changed or reversed in its rotational direction, and thus the response characteristic of the servo-motor can not be improved because of various factors such as inertia of the motor, elastic deformations of a ball screw and of a feed table.

It is an object of the present invention, therefore, to provide a cutting apparatus for a noncircular cross section in which the above-described various disadvantages of the prior art are eliminated, that is: the problem of the follow-up characteristic as in the conventional profiling machining device can be eliminated. the workpiece can be rotated at a high speed to be subject to a high speed cutting operation; the cycle-time of the machine can be substantially decreased; any configuration of the workpiece can be machined the change of the configuration of the workpiece can easily be accommodated by said apparatus; and high accuracy of working can be maintained for a long time.

SUMMARY OF THE INVENTION

The above-described object can be achieved by a cutting apparatus for a noncircular cross section characterized in that said apparatus is provided with a tool advancing and retreating means, said means comprising:

(a) a central shaft disposed perpendicularly to a main shaft to which a workpiece is to be attached, a tool being adapted to be fixed to one end of said central shaft;

(b) journal means for supporting said central shaft so that said central shaft can be moved or displaced in its axial direction but can not be rotated;

(c) a movable plate fixed to said central shaft;

(d) electromagnets opposite to each other so that said movable plate is interposed between said electromagnets with a predetermined clearance therebetween;

(e) means for detecting a rotating angle of said main shaft:

(f) a displacement sensor for detecting a longitudinal displacement of said central shaft;

(g) a speed sensor for detecting a speed of said longitudinal displacement of said central shaft; and (h) means for controlling an electric current passing through said electromagnets on the basis of output signals from said rotating angle detecting means, from said displacement sensor, and from said speed sensor. Said journal means preferably comprises springs such as leaf springs and coil springs.

The operation of the cutting apparatus for the noncircular cross section provided with the tool advancing and retreating means having the above-described structures according to the present invention is as follows:

The rotation of the main shaft to which a workpiece is attached causes said rotating angle detecting means to synchronously rotate, said rotating angle detecting means detecting a rotation number and a rotating angle of said main shaft. Thus, an electric current passing through said electromagnets is controlled by way of said control means correspondingly to said rotation number and rotating angle. While this control of said electric current causes an attracting force exerted on said movable plate by means of said electromagnets to be controlled, said movable plate and said central shaft fixed thereto are longitudinally displaced. This displaced condition is detected by means of said displacement sensor and said speed sensor which generate respective output signals, on the basis of which a feedback control is performed while the tool attached onto the central shaft is advanced to or retreated from the workpiece, as a result of which the workpiece can be cut or machined to be provided with the noncircular cross section.

BRIEF DESCRIPTION OF THE DRAWINGS

The present invention will be described in more detail by way of example in conjunction with the accompanying drawings, in which.

PREFERRED EMBODIMENTS OF THE INVENTION

Figure 1:
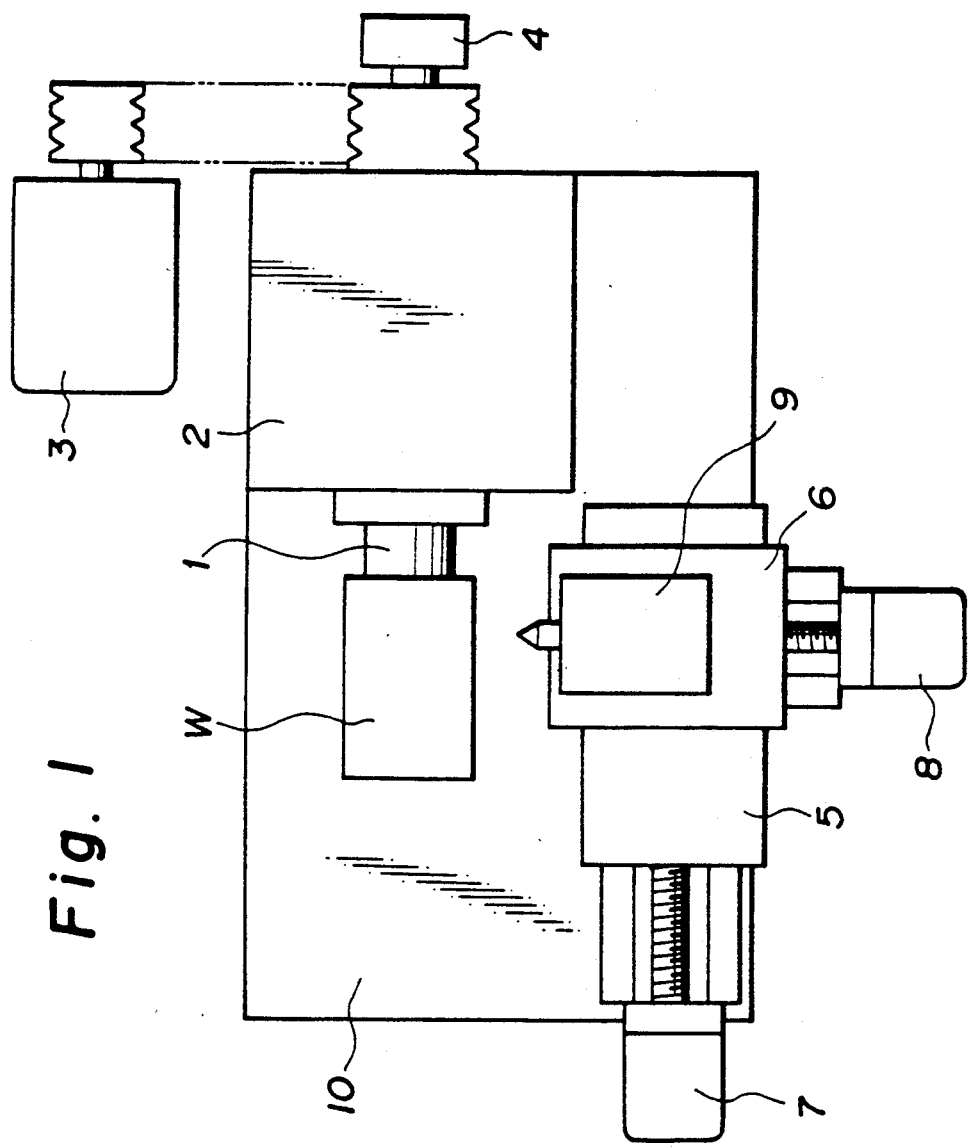
FIG. 1 is a schematic plan view showing an example of a cutting apparatus for a noncircular cross section according to the present invention.
Figure 2:
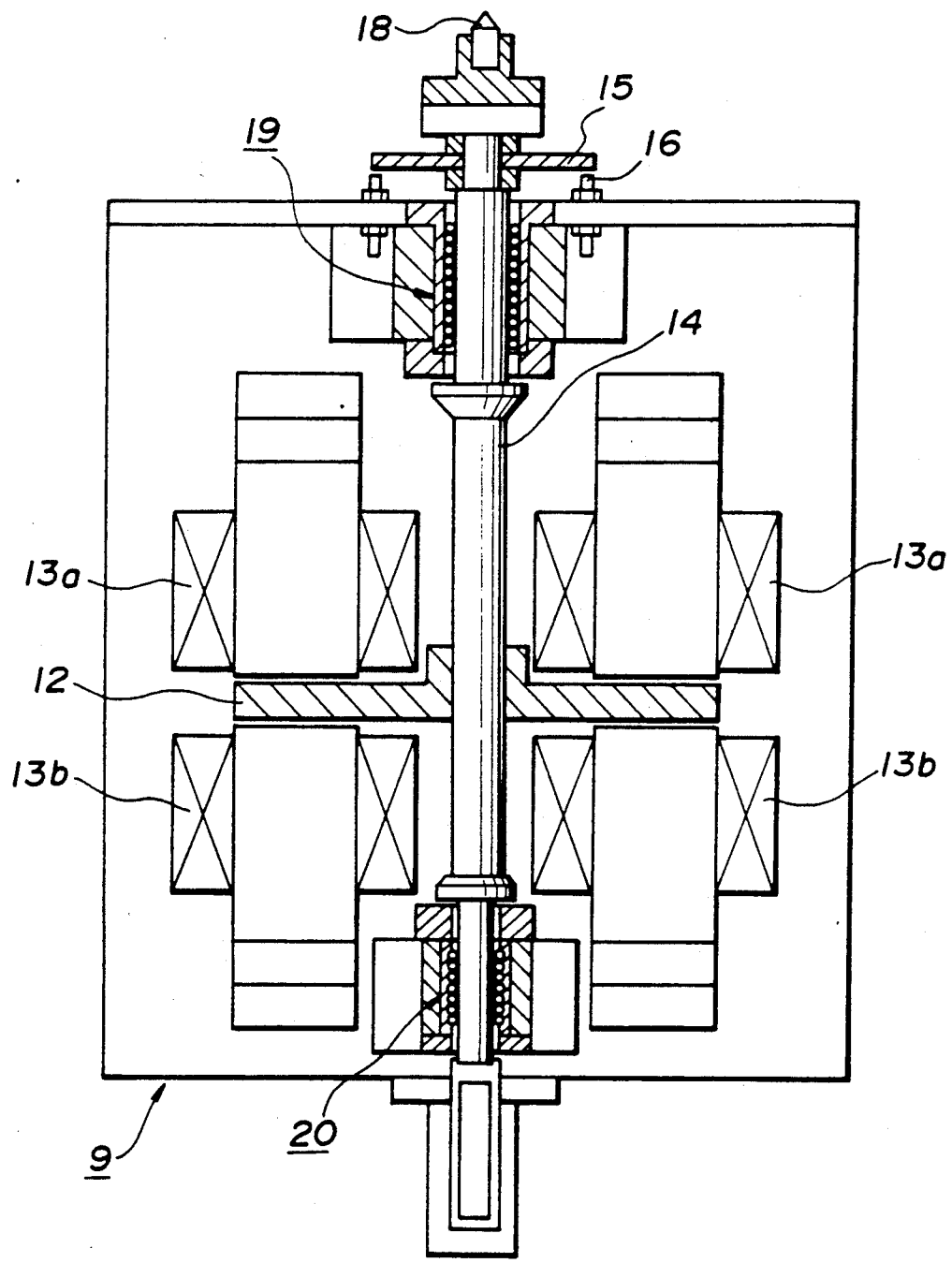
FIG. 2 is a partially broken plan view of a tool advancing and retreating means included in said cutting apparatus for a noncircular cross section.
Figure 3:
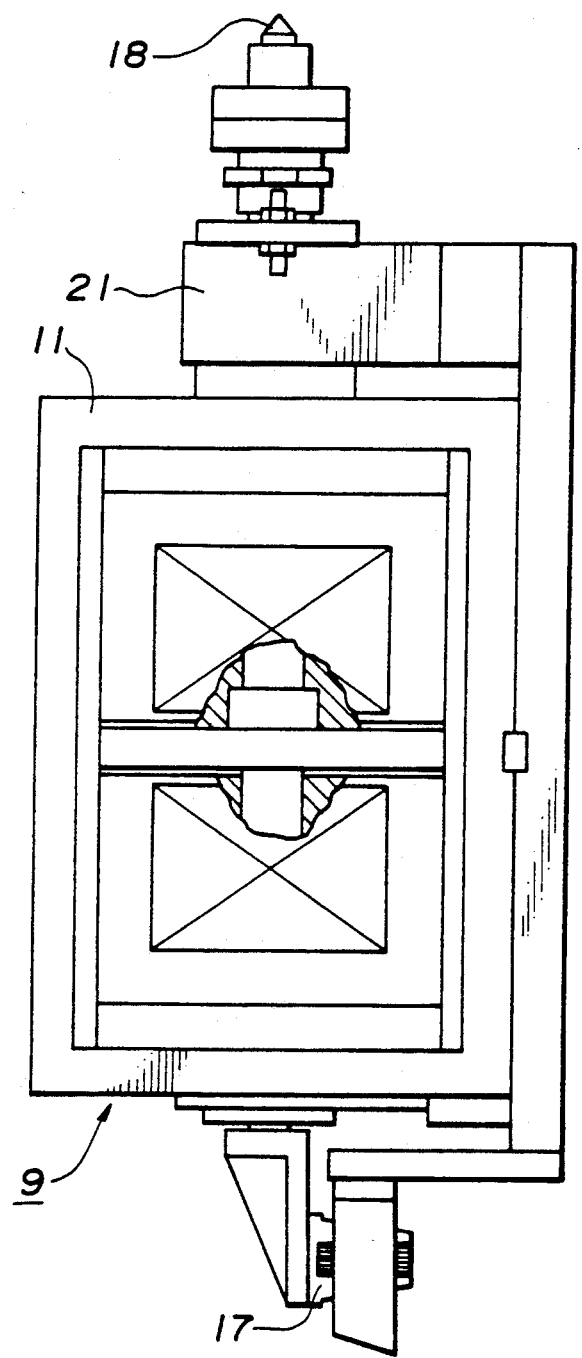
FIG. 3 is a side view of FIG. 2.

Referring now to FIGS. 1 to 3, a reference numeral 1 denotes a main shaft provided with a workpiece holder means, 2 denotes a headstock, 3 denotes a servo-motor for rotating the main shaft, 4 denotes a rotation angle detecting means, 5 denotes a feed table to be adapted to move in a directions parallel to the main shaft, 6 denotes a feed table to be adapted to move in a direction perpendicular to the main shaft, 7 denotes a servo-motor for driving the feed table 5, 8 denotes a servo-motor for driving the feed table 6, 9 denotes a tool advancing and retreating means mounted on the feed table 6, 10 denotes a bed, 11 denotes a mount, 12 denotes a movable plate, 13a, 13a and 13b, 13b denote electromagnets opposite to each other so that the movable plate is interposed between said electromagnets with a predetermined clearance therebetween, 14 denotes a central shaft, 15 denotes a displacement measuring plate, 16 denotes a displacement sensor, 17 denotes a speed sensor, 18 denotes a tool, 19 denotes a ball spline (i.e. a spline within which balls are rolled), 20 denotes a linear bush, and 21 denotes a supporting base, respectively.

As shown in FIG. 1, main shaft 1 provided with a workpiece holder for holding the workpiece W is rotatably supported by the headstock and is adapted to drive by means of a servo-motor 3. Rotating angle detecting means 4 consisting of an encorder, etc. attached to the headstock 2 at its back portion is also adapted to be rotated synchronously with the workpiece W.

The feed table 5 is slidably mounted on the bed 10 so that the feed table 5 can slide in a direction parallel to the main shaft 1 (i.e. X axial direction), that is, the feed table 5 is adapted to be controllably fed by means of a screw feeder mechanism to be driven by servo-motor 7. Further, another feed table 6 is mounted to slide on said feed table 5 so that the feed table 6 can slide in a direction perpendicular to said X axial direction (i.e. Y axial direction), that is, the feed table 6 is adapted to be controllably fed by means of another screw feeder mechanism to be driven by another servo-motor 8. The tool advancing and retreating means 9 is mounted on the feed table 6 in the order to advance or retreat tool 18 in Y axial direction (i.e. a radial direction of workpiece W).

In FIG. 2 and FIG. 3, said tool advancing and retreating means 9 is shown in detail. FIG. 2 is a plan view and FIG. 3 is a side view.

The electromagnets 13a, 13a and 13b, 13b (for example four pieces) opposite to each other are attached to the mount 11, between which the movable plate 12 is interposed with a predetermined clearance therebetween. The movable plate 12 is securely attached to the central shaft 14. The central shaft 14 is axially movable but nonrotatably journaled with the ball spline 19 at one end near the tool 18 to be attached to the central shaft 14, and is axially movably journaled with the linear bush 20 at the other end of the central shaft 14.

An electric current passing through the electromagnets 13a, 13a or 13b, 13b causes the movable plate 12 to be attracted towards the electromagnets 13a, 13a or 13b, 13b through which the electric current passes, and at the same time, the central shaft 14 is longitudinally moved together with the movable plate 12.

The tool 18 is attached to the one end of the central shaft 14, and is adapted to move back and forth in a direction perpendicular to a rotating shaft, i.e. the main shaft 1 on which the workpiece W is secured, whereby the workpiece W can be machined so that its cross section perpendicular to the axis of the main shaft 1 has a desired noncircular configuration.

In other words, the passing of an electric current through said electromagnets 13a, 13a or 13b, 13b is adapted to be effected by means of a control means (not shown) on the basis of an output signal from the rotation angle detecting means 4 for detecting a rotating angle of the main shaft 1 and synchronously with the rotation of the main shaft 1, so that the tool 18 can be advanced or retreated a small distance in a direction perpendicular to the main shaft 1 at a predetermined angular position during one rotation of the workpiece. Thus, the workpiece W can be machined so as to have a noncircular cross section perpendicular to the axis of the main shaft 1.

Further, on the one end of the central shaft 14, a displacement measuring plate 15 is secured, the amount of displacement of which is adapted to be detected by the displacement sensor 16 attached to the supporting base 21.

On the other end of the central shaft 14, a speed sensor 17 is attached, which is adapted to detect a displacement speed of the movable plate 15.

The values measured respectively by the displacement sensor 16 and the speed sensor 17 as feed-back data are inputted into a numerical control device (not shown) and are utilized to control the attracting force and frequency response characteristics of the electromagnets 13a, 13a and 13b, 13b.

Thus, while the workpiece W is machined so as to have a noncircular cross section perpendicular to the central shaft 14, servo-motors 7 and 8 are simultaneously controlled to thereby feed-control simultaneously the feed tables 5 and 6, whereby a generatrix of the outer circumferencial surface of the workpiece W can be changed along its axial direction.

In the tool advancing and retreating means 9 shown in FIG. 2, the ball spline 19 is utilized to journal the one end of the central shaft 14, and therefore balls within the spline 19 are abroaded through its use for a long period of time, thus possibly exerting a bad influence upon the working accuracy.

Further, when the axial movement of the central shaft 14 is controlled only by means of the electromagnets, as described below, an excess electric current has to pass through the electromagnets in order to stabilize the axial movement As a result, the response characteristic of the electromagnets will be lowered and the electric power is used wastefully.

Figure 4:
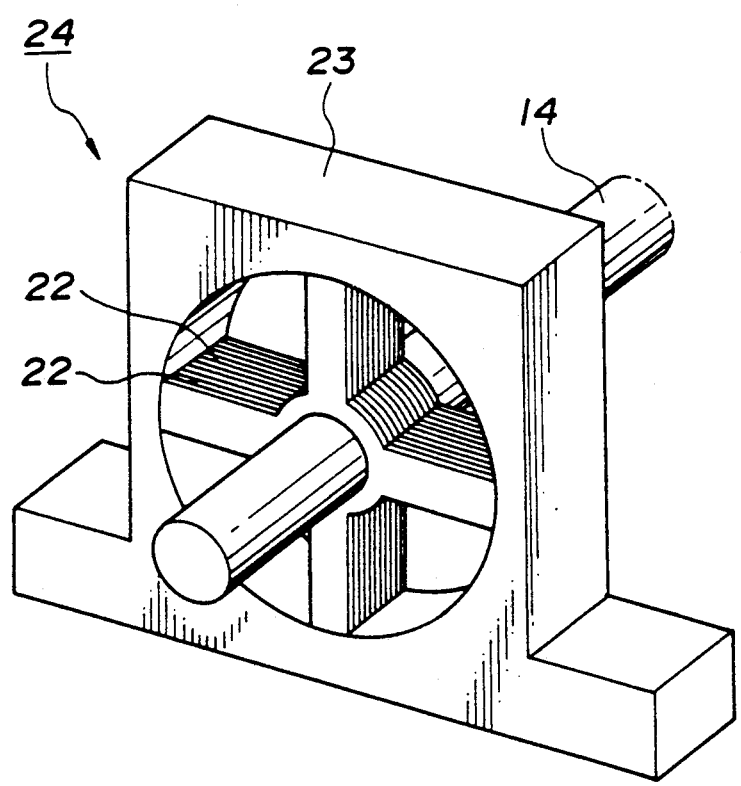
FIG. 4 is perspective view showing a preferred embodiment of journal means of a leaf-spring type for supporting the central shaft of the tool advancing and retreating means.
Figure 5:
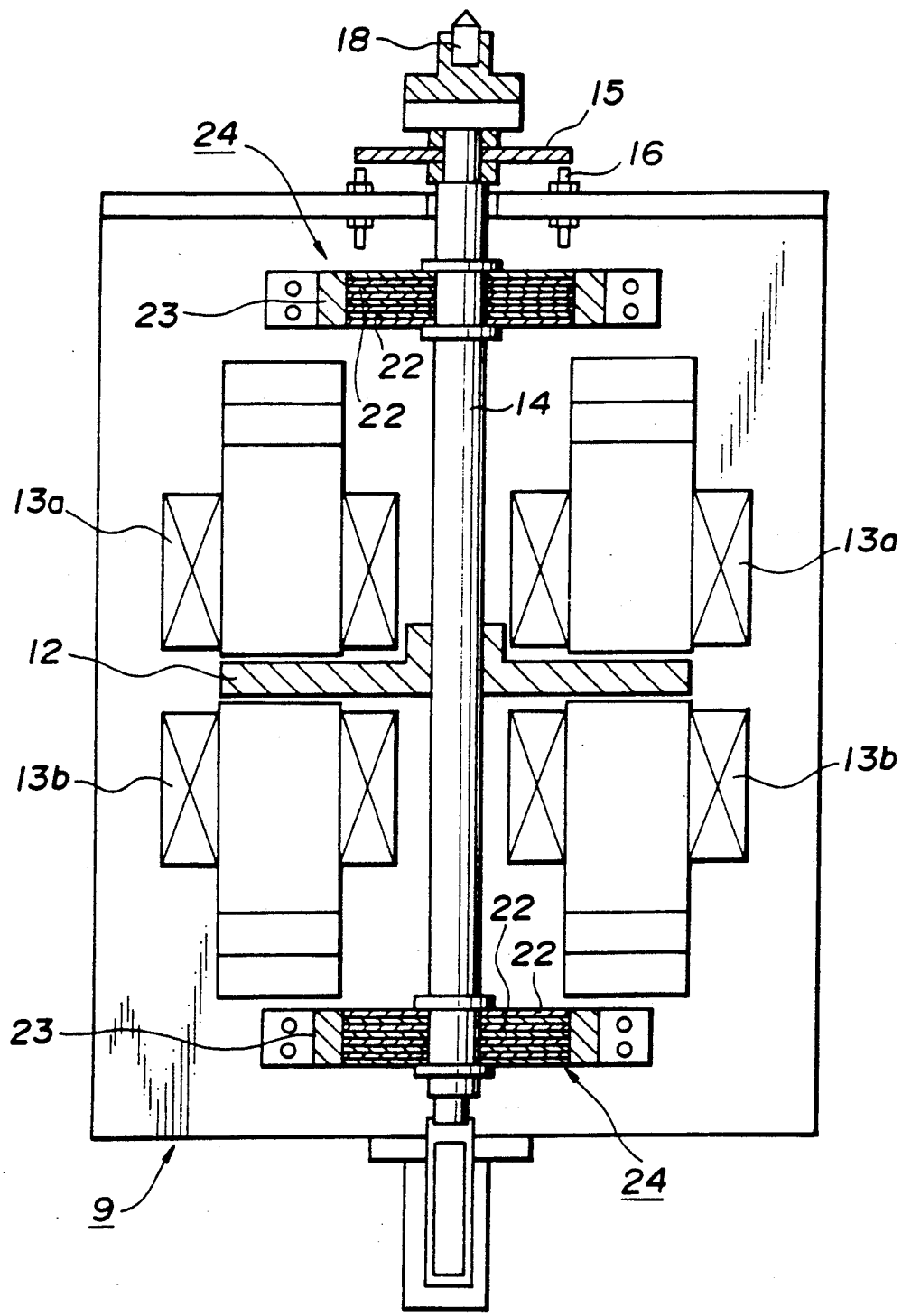
FIG. 5 is a partially broken plan view of the tool advancing and retreating means incorporating the journal means of the leaf spring type shown in FIG. 4.

One improved example of the journal means 24 for the central shaft 14 for eliminating the above-described problem is shown in FIG. 4, and the tool advancing and retreating means incorporating this journal means 24 is shown in FIG. 5.

In the journal means 24 shown in FIG. 4, the central shaft 14 which is adapted to have the tool attached to the one end thereof is secured to a holder 23 by way of a laminated product made by laminating many flexible thin leaf springs 22, 22 of a cross configuration. The leaf springs 22, 22 are secured to the central shaft 14 at central bores of the springs, and to the holder 23 at outer end portions of the leg portions extending outwardly from the central bores, respectively. In FIG. 5, the central shaft 14 is supported by the journal means 24 instead of the ball spline 19 and linear bush 20 in the example of FIG. 2, and the holders 23, 23 (i.e., first and second holders) of journal means 24 are secured to the mount 11 by screw means etc.

Accordingly, when the movable plate 12 is attracted by the electromagnets 13a, 13a or 13b, 13b to thereby move together with the central shaft 14 in the axial direction thereof, the flexible leaf springs 22, 22 are bent to allow this axial movement or displacement of the central shaft 14, but the rotation of the central shaft 14 is prevented by the springs 22, 22 secured to the holders 23, 23, whereby the central shaft 14 can sufficiently support a cutting reaction force exerted by the tool 18 which is cutting the workpiece W.

Figure 6:
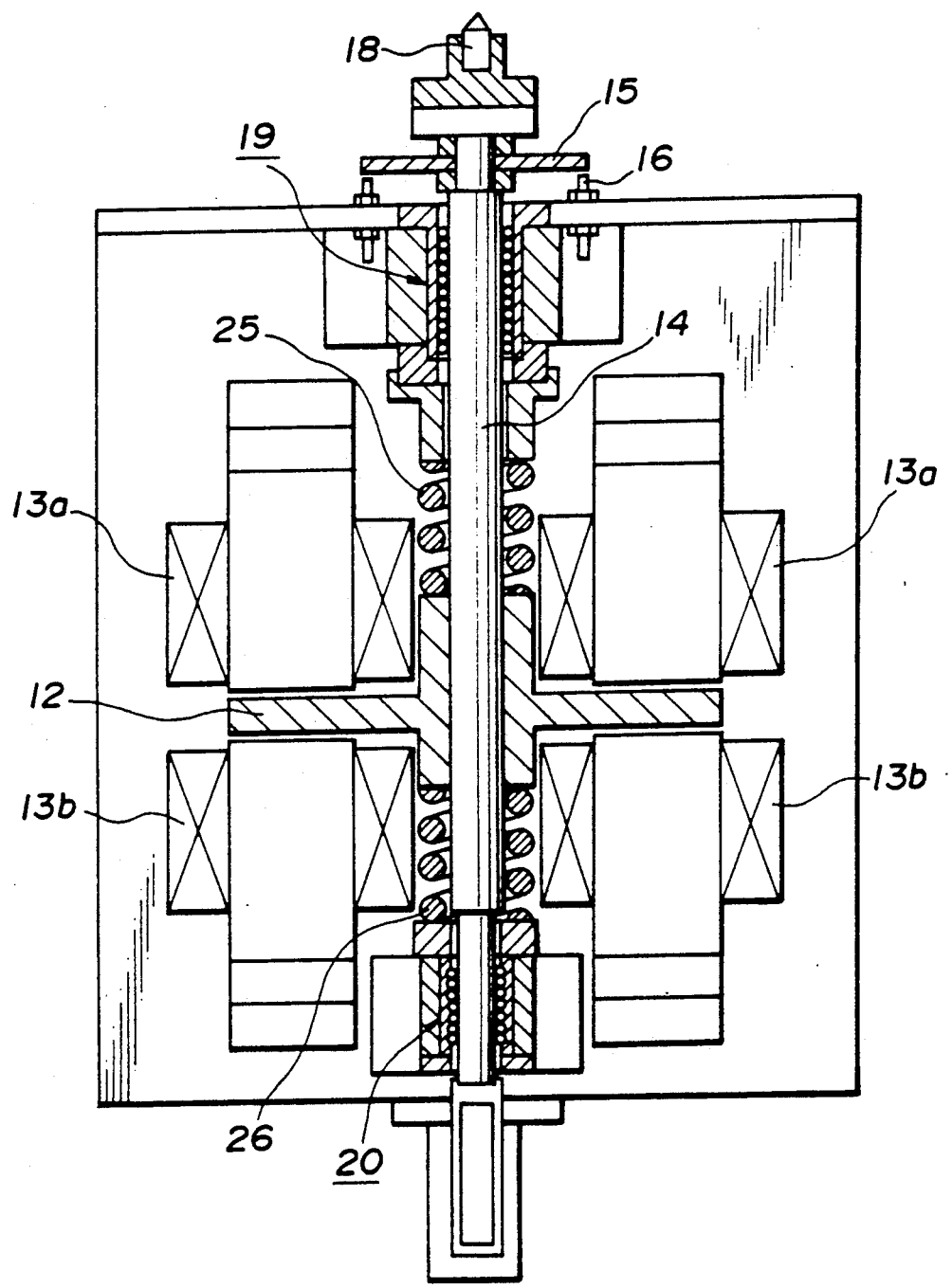
FIG. 6 is a partially broken plan view of the tool advancing and retreating means utilizing the journal means of a coil-spring type.

In another embodiment of the present invention shown in FIG. 6, a pair of coil springs 25, 26 are disposed around the central shaft 14 which are adapted to damp the axial movement of the central shaft 14. The movable plate preferably consists of a laminated silicon steel plate, but is required to have such a rigidity or stiffness that it can not be affected or bent by the attracting force of the electromagnets in this apparatus. The steel plate is therefore used, but when it is attracted by the electromagnets an eddy current may be generated therein, thus lowering the frequency response characteristic. Therefore, in order to avoid the eddy current loss, slits may be formed in the plate. Other elements are the same as that shown in FIG. 2.

Figure 8:
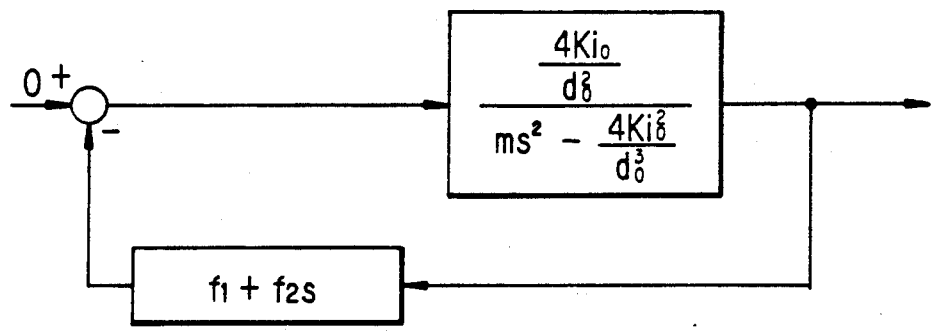
FIG. 8 is a schematic diagram showing a transfer characteristic of a control system necessary for stabilizing the apparatus when the journal means is not provided with springs.

When the movable plate 18 and thus the tool 12 are controllably positioned using the attracting force of the electromagnets, this force is proportional to the displacement of the movable plate 12 within a range capable of being linear-approximated. Such attracting force is similar to a force by a spring having a negative spring constant, and a system subject to such force is unstable. Accordingly, in order to stabilize such system, it is recommended to effect the feed-back as shown in FIG. 8 or to cancel or offset this negative spring force by a force of a spring having a positive spring constant as shown in FIG. 5 or FIG. 6.

Generally, in order to stabilize such a system, a method in which a displacement signal of the movable plate 12 is fed-back is utilized, but this method requires an excess electric current for stabilization and lowers the response characteristic of the electromagnets.

Such problems can be overcome by attaching the springs having the general positive spring constant to the movable plate 12 to thereby cancel or offset the negative spring constant by the positive spring constant.

First, problems concerning the control of the electromagnetic attracting force will be considered.

It is assumed that there is an interrelationship represented by the following formula (1):

$$F = K \cdot \frac{I^2}{d^2} \quad (1)$$

where,
F is an electromagnetic attracting force acting to a body to be attracted by the electromagnets,
I is an electric current passing through the electromagnets,
d is a distance between the electromagnets and said body, and
K is a constant dependent upon or determined by the electromagnets.

Figure 7:
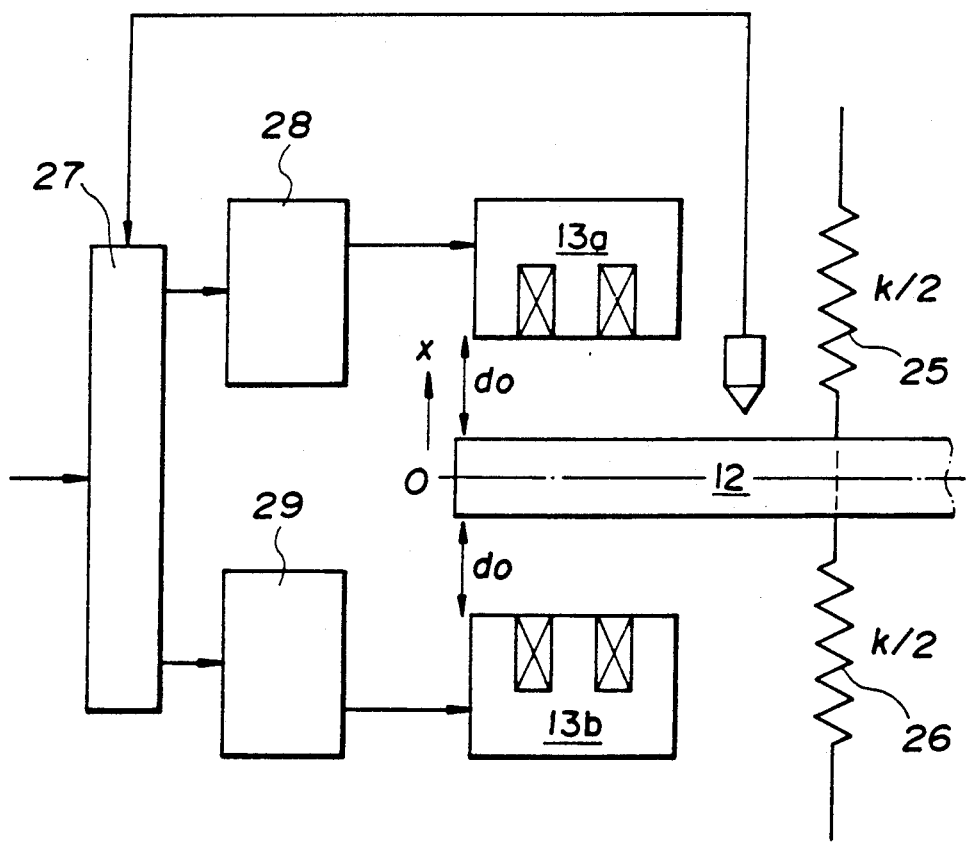
FIG. 7 is a schematic diagram showing a principle for controlling a position of the tool attached to the tool advancing and retreating means utilizing electromagnets and springs.

First, a control system as shown in FIG. 7 will be considered. In this control system, if there is no springs 25 or 26, the motion equation of the movable plate 12 can be represented by the following formula (2) obtained from the formula (1), $$m\ddot{x} = \frac{K(i_o - i)^2}{(d_o - x)^2} - \frac{K(i_o + i)^2}{(d_o + x)^2} \quad (2)$$

where,
m is mass of the movable plate 12,
x is a displacement of the movable plate 12 from a datum point at which the movable plate 12 is positioned in an equal distance do from both electromagnets 13z and 13b, the direction of x from the movable plate 12 towards the electromagnet 13z being represented by positive sign (+), and
i is a control electric current.

In FIG. 7, reference numeral 27 denotes a control circuit, and reference numerals 28 and 29 denote constant-current amplifiers, respectively.

In the formula (2), it is assumed that $d_o >> x$ and $i_o >> i$. When the formula (2) is linear-approximated assuming that x=0 and i=0 represent an equilibrium point, the formula (2) can be represented by the following formula (3):

$$m\ddot{x} = \frac{4 K i_o^2}{d_o^3} \cdot x - \frac{4 K i_o}{d_o^2} \cdot i \quad (3)$$

The first item of the right side of the formula (3) is an unstability factor owing to the negative spring constant.

When the goal motion at which the movable plate 12 aims is provided by the formula,
x=a.sin wt, an amplitude ia of the control electric current i can be represented by the following formula (4).

$$i_a = \frac{a d_o^2}{4 K i_o} \cdot m\omega^2 + \frac{a}{d_o} \cdot i_o \quad (4)$$

The first item of the right side of the formula (4) is an electric current for obtaining an external force necessary for moving the movable plate 12, and the second item is an electric current necessary for cancelling the unstable force resulting from the negative spring constant.

In other words, because of the existence of the unstability factor represented by the first item of the right side of the formula (3), the control electric current is required which is larger than that necessary for moving the movable plate.

Particularly, when the value of the electric current represented by the first item of the right side of the formula (4) is relatively large and has to be controlled near the allowable maximum frequency for the electromagnets, the values of the electric current represented by the second item and of the amplitude ia are also increased, and in addition the movable plate is required to have larger rigidity.

In other words, since the control system represented by the formula (3) is unstable, it is required to feed-back the displacement signal of the movable plate 12 to thereby stabilize this system. In this case, the static rigidity of the movable plate is determined by the feedback gain fl of the position, using the following formula (5):

$$\frac{f}{x} = \frac{4 K i_o}{d_o^3} (f_1 d_o - i_o) \quad (5)$$

In view of the formula (5), an excess gain is required which is sufficient to offset or cancel the negative rigidity (negative spring constant) of the electromagnets, passed through the electromagnets.

In this manner, when the control system using the electromagnetic attracting force is tried to be stabilized by the feed-back, the excess electric current has to be passed through the electromagnets, whereby the performance of the system is lowered. Further, since the construction of the stable control system has to be settled beforehand, the design of the control system is restricted by the above condition.

In FIG. 7, when there are springs 25, 26, the motions equation of the movable plate 12 can be represented by the following formula (6):

$$m\ddot{x} = \frac{K(i_o - i)^2}{(d_o - x)^2} - \frac{K(i_o + i)^2}{(d_o + x)^2} - kx \quad (6)$$

When the formula (6) is linear-approximated, the following formula (7) can be obtained.

$$m\ddot{x} = \left(\frac{4 K i_o^2}{d_o^3} - k\right) \cdot x - \frac{4 K i_o}{d_o^2} \cdot i \quad (7)$$

In this case, the amplitude ia of the control electric current i can be represented by the following formula (8):

$$i_a = \frac{a d_o^2}{4 K i_o} \cdot m\omega^2 + \frac{a d_o^2}{4 K i_o}\left(\frac{4 K i_o^2}{d_o^3} - k\right) \quad (8)$$

In the formula (8), if the spring constant k is determined so that the second item of the right side of this formula (8) is zero, the amplitude ia may be only that corresponding to the electric current necessary for moving the movable plate 12, and thus the required electric current can be decreased. And also, the static rigidity is represented by the following formula (9):

$$\frac{f}{x} = \frac{4 K i_o}{d_o^2} \cdot f_i \quad (9)$$

Accordingly, it is most required to provide the excess gain.

Figure 10:
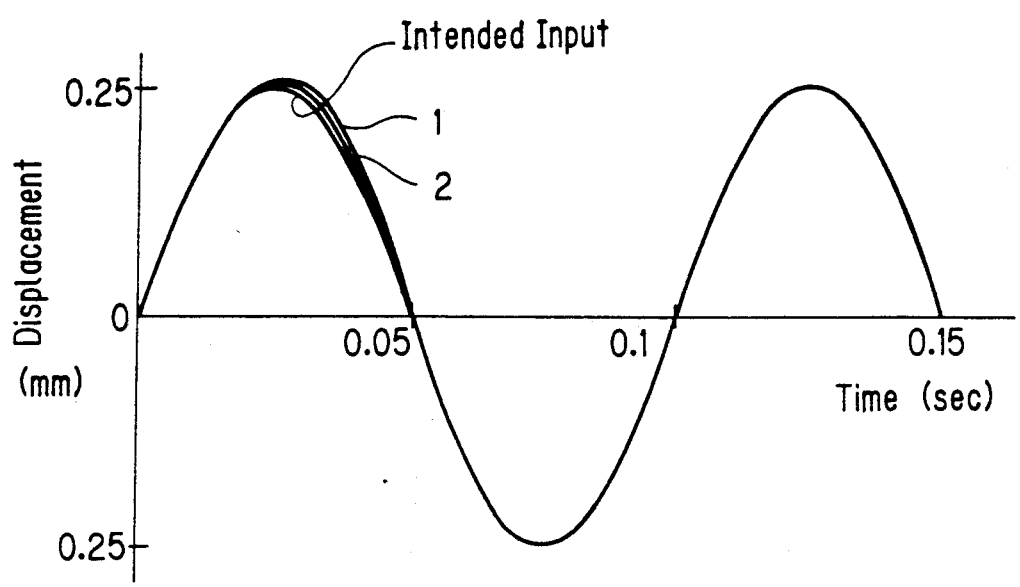
FIG. 10 is a graph showing a position of the movable plate.
Figure 11:
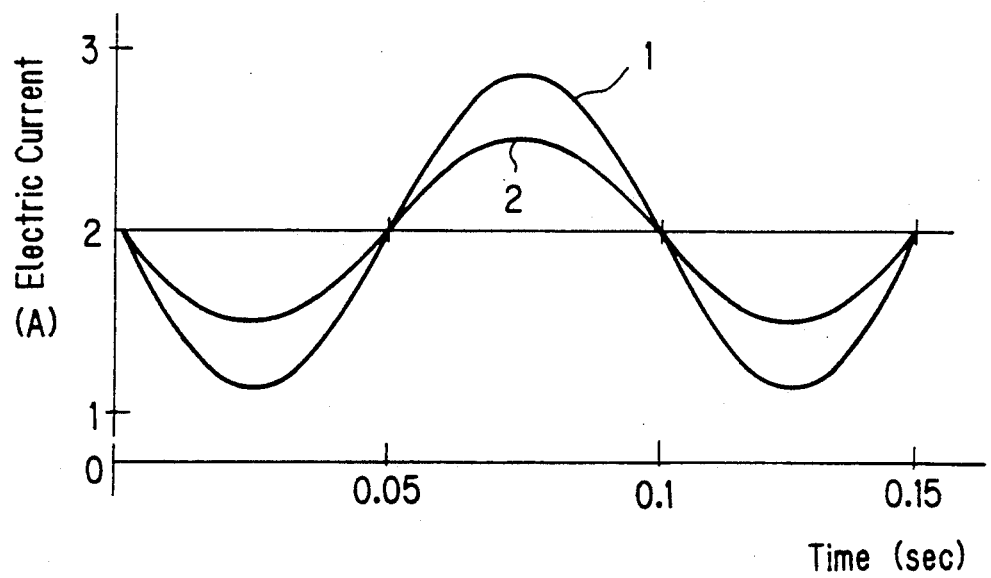
FIG. 11 is a graph showing the change of an electric current passing through the electromagnets.

In order to visualize the effects of the added springs, each parameter is substituted by concrete values, and the simulation on the basis of a non-linear model is effected, the results of which are shown in FIG. 10 and FIG. 11.

Figure 9:
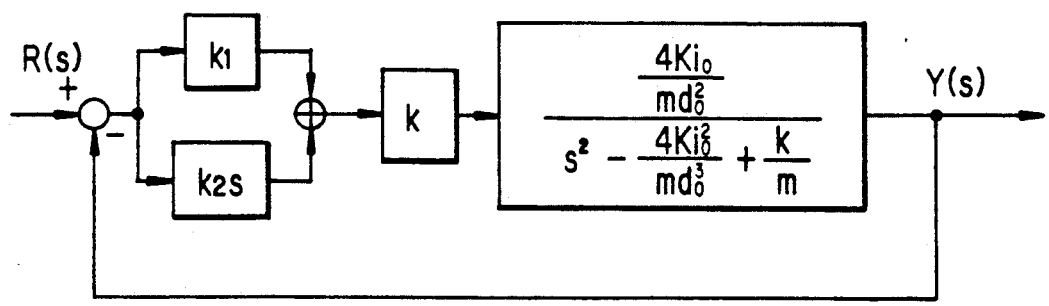
FIG. 9 is a schematic diagram showing a transfer characteristic of a control system when the springs are added to the journal means.

The control system is constructed as shown in FIG. 9 and the goal input r(t) is represented by r(t) =0.25 sin 200 t (mm). In addition, K in FIG. 9 represents the ratio between the displacement of the movable plate and the electric current passing through the electromagnets, i.e., "gain". It was assumed that the characteristic of the constant electric current amplifier included in this element can ideally act on this system in this simulation. The values of the parameters in FIG. 9 are as follows:

K = 23000, k = 5.5 × 10$^{-4}$ Nm$^2$/A$^2$ m = 10 kg, do = 1.5 mm, io = 2.0 A

The results of the simulation are shown in FIG. 10 and FIG. 11. FIG. 10 is a graph showing a relation between the positioning or displacement (mm) of the movable plate 12 and time (sec). FIG. 11 is a graph showing a relation between the electric current (A) passing through the electromagnets and time (sec). In both of FIG. 10 and FIG. 11, (1) represents a result of the case in which no springs are not provided, and (2) represents a result of the case in which the springs having the spring constant determined by the formula (8) are provided, respectively. The goal input is r(t)=0.25 sin 200 t (mm). The values of the parameters are as follows:

In the case of (1) k1=0.8. k2=0.005, k=0 (N/m),
In the case of (2) K1=1, K2=0.01, k=2.6×10$^6$ It is obviously recognized from both of FIG. 10 and FIG. 11 that if gain k1 and gain k2 are appropriately determined, the positioning of the movable plate can be performed at similar accuracy in both cases (1) and (2), but the electric current necessary for the positioning in the case of (2) is smaller about 40% than that in the case of (1). This is the effect of the springs.

In this manner, if the negative spring constant existing in the control system is offset or canceled by adding stable springs to the positioning mechanism utilizing the electromagnetic attracting force by the electromagnets as a driving force, the electric current passing through the electromagnets can be restrained and thus the control characteristic can be improved.

The embodiments shown in FIG. 5 and FIG. 6 utilize this effect.

In addition to this effect restraining the required electric current, this method enables a stable and approximately linear system to be constructed, and thus the linear control can easily be applied, and the improvement of the accuracy of the positioning of the movable plate 12 is also possible. Further, when the positioning of the movable plate has to be performed using this mechanism while the movable plate is subject to an external force such as a working force, if the pressurization force which can resist said external force is imparted to the movable plate, the control of the electric current can be performed without being influenced by any external disturbance.

Further, there is a vibration-proof effect in use of the springs. When the work-piece is rotated in the apparatus, mechanical vibrations are generated resulting from various elements such as a motor, belts, and bearings; as a result, such mechanical vibrations will lower the accuracy of the workpiece to be machined. In the present mechanism, as the springs are used to support the tool, the generated vibrations may be damped or absorbed, resulting in an advantageous effect on the precise-working.

Since the present invention is constructed as described above, according to the present invention, the problem of the follow-up characteristic as in the conventional profiling machining device can be eliminated, the response speed is high because of a simple mechanism utilizing the attracting force by the electromagnets, the workpiece can be rotated at a high speed to be subject to a high speed cutting operation, the cycle-time of the machine can be substantially decreased, any configuration of the workpiece can be formed, the change of the configuration of the workpiece can easily be accommodated by the present apparatus, and the high working accuracy can be maintained for a long time.

It should be recognized that the present invention is not limited to the above-described embodiments, but is intended to include all such alternative embodiments that could be easily thought by a person with ordinary skill in the art to which the invention pertains.

What is claimed is:

1. A cutting apparatus for forming a noncircular cross section on a workpiece that is mounted on a main shaft, said apparatus including a tool advancing and retreating means which comprises:

a central shaft which is disposed substantially perpendicular to the main shaft, a tool being adapted to be fixed to one end of said central shaft;

journal means for supporting said central shaft so that said central shaft can be displaced in its axial direction but cannot be rotated, said journal means including a plurality of cross-shaped first leaf springs which are laminated to one another and which each have a centrally located bore extending therethrough, said central shaft extending through the centrally located bore in each of said first leaf springs and being secured to each of said first leaf springs, said first leaf springs being mounted within and secured to a first holder which is secured to said mount near one end of the central shaft, and including a plurality of cross-shaped second leaf springs which are laminated to one another and which each have a centrally located bore extending therethrough, said central shaft extending through the centrally located bore in each of said second leaf springs and being secured to each of said second leaf springs, said second leaf springs being mounted within and secured to a second holder which is secured to said mount near an opposite end of the central shaft;

a movable plate fixed to said central shaft;

electromagnets positioned opposite to each other such that said movable plate is interposed between said electromagnets with a predetermined clearance therebetween;

means for detecting a rotational angle of said main shaft;

a displacement sensor for detecting longitudinal displacement of said central shaft;

a speed sensor for detecting a speed of said longitudinal displacement of said central shaft; and means for controlling an electric current passing through said electromagnets on the basis of output signals from said rotational angle detecting means, from said displacement sensor, and from said speed sensor, respectively.

* * * * *